United States Patent [19]

Kato et al.

[11] Patent Number: 5,019,537
[45] Date of Patent: May 28, 1991

[54] FORMING AIDS FOR CERAMIC MATERIALS, CERAMIC BODIES FORMED BY USING THE AIDS, AND PROCESS OF PRODUCING CERAMIC PRODUCTS

[75] Inventors: Kiminari Kato; Masahiro Shirai, both of Nagoya, Japan

[73] Assignee: NGK Insulators, Ltd., Aichi, Japan

[21] Appl. No.: 186,692

[22] Filed: Apr. 21, 1988

Related U.S. Application Data

[63] Continuation of Ser. No. 903,703, Sep. 4, 1986.

[30] Foreign Application Priority Data

Sep. 10, 1985 [JP] Japan .................................. 60-201138

[51] Int. Cl.$^5$ ...................... C04B 11/02; C04B 11/04; C04B 105/02; C04B 107/02
[52] U.S. Cl. ........................................... 501/1; 501/90; 501/92; 501/97; 501/103; 585/9; 585/10; 585/11; 585/12; 585/13; 524/560
[58] Field of Search ...................... 524/560; 585/9, 10, 585/11, 12, 13; 264/6, 3; 501/90, 92, 97, 103

[56] References Cited

U.S. PATENT DOCUMENTS

| | | | |
|---|---|---|---|
| 3,242,075 | 3/1966 | Hunter | 585/12 |
| 4,000,110 | 12/1976 | Saito et al. | 264/63 |
| 4,144,207 | 3/1979 | Ohnsorg | 264/56 |
| 4,239,632 | 12/1980 | Baile | 585/10 |
| 4,448,700 | 5/1984 | Lankamp | 585/12 |
| 4,460,527 | 7/1984 | Kato | 264/63 |
| 4,485,182 | 11/1984 | Enomoto et al. | 264/63 |
| 4,551,496 | 11/1985 | Renlund et al. | 264/63 |
| 4,568,502 | 2/1986 | Theodore et al. | 264/63 |

FOREIGN PATENT DOCUMENTS 49-114610 11/1974 Japan .
57-156365 9/1982 Japan .
58-223662 12/1983 Japan .

*Primary Examiner*—Theodore Morris
*Assistant Examiner*—David M. Brunsman
*Attorney, Agent, or Firm*—Parkhurst, Wendel & Rossi

[57] ABSTRACT

A forming aid to be mixed in a ceramic material for forming the ceramic material into a formed ceramic body of a desired shape, including at least one of a thermoplastic resin and a wax, and a mineral oil in an amount of 30–95% by volume with respect to an entire volume of the aid. Also disclosed is a process of producing a ceramic article from the formed ceramic body containing the aid.

33 Claims, No Drawings

FORMING AIDS FOR CERAMIC MATERIALS, CERAMIC BODIES FORMED BY USING THE AIDS, AND PROCESS OF PRODUCING CERAMIC PRODUCTS

This is a continuation of application Ser. No. 903,703 filed Sept. 4, 1986 now abandoned.

BACKGROUND OF THE INVENTION

1. Field of the Invention

The present invention relates in general to aids used in the field of forming ceramics, ceramic bodies or pieces produced using such forming aids, and a process of forming ceramic articles or products with such aids. More particularly, the invention is concerned with a forming aid which contains mineral oil as a major component, and which is suitably used for forming a ceramic material into a desired shape. The invention is further concerned with formed ceramic bodies obtained by using such a forming aid, and a process of producing ceramic products (fired ceramic bodies) from such formed ceramic bodies.

2. Discussion of the Related Art and Problems Solved by the Invention

Silicon nitride, silicon carbide and other silicon ceramics, alumina and zirconia ceramics and similar ceramics are more stable at an elevated temperature (more resistant to heat and thermal stresses), and more resistant to oxidation corrosion and creep deformation, than metals. Active efforts have been made to utilize these excellent properties of such ceramic materials for engine parts such as turbocharger rotors.

In the art of fabricating such ceramic parts, there has been practiced a process which comprises: adding to a suitably prepared ceramic material an organic binder (forming aid) whose major component is a resin or wax, and kneading the ceramic material and the organic binder into a mixture; forming the mixture into a formed body of a desired shape; and heating the formed body so as to remove the binder and fire the formed body into a fired ceramic body, i.e., a desired ceramic product. An injection-molding process is suitably used for efficient, highly accurate production of parts having a complicated configuration, in particular, the rotors referred to above.

As the forming aids, the following organic binders are commonly used in the process indicated above: an organic binder which includes as a major component or components a thermoplastic resin such as polystyrene, polyethylene, co-polymer of ethylene and vinyl acetate, and atactic polypropylene; an organic binder whose major component or components consist of a wax such as paraffin wax and microcrystalline wax; an organic binder including a sublimable material as a major component; and an organic binder which includes two or more materials selected from among the preceding materials. For example, the use of atactic polypropylene and polyethylene as major components of an organic binder is proposed in Laid-Open Publication 49-114610 of Japanese Patent Application, and the use of an organic binder including a wax as a major component is proposed in Laid-Open Publication 58-223662 of Japanese Patent Application. Further, Laid-Open Publication 57-156365 of Japanese Patent Application discloses an organic binder which includes atactic polypropylene and a sublimable material as major components. While these various organic binders have been used in the art, the following requirements must be satisfied to provide flawless ceramic products:

a) high level of formability of a mixture of a ceramic material and an organic binder, to assure exact formation of the ceramic material to an intended shape without geometrical defects;

b) freedom from damage or defects of the formed ceramic piece or body during removal of the organic binder; and c) sufficiently high homogeneity and density of the fired structure or product.

However, the conventionally used organic binders whose major components are selected from thermoplastic resins, waxes and sublimable materials do not necessarily satisfy all of the requirements indicated above. For example, an organic binder which is excellent in formability suffers from a drawback that it tends to cause cracking of the formed ceramic body during removal of the binder. If a thermoplastic resin is used in a relatively large amount, the formed ceramic body may be broken or damaged due to a pressure of gases which are produced in a large volume due to decomposition of the resin, that is, the resin tends to cause cracking of the ceramic body during removal of the binder. Therefore, a complete removal of the binder is difficult. In the case where a large amount of wax is used as a binder, the rate of removal of the wax is very low since the removal is effected by a viscous flow of the wax. In this case, the formed body tends to have a fairly high residual strain or permanent set, which may cause the formed body to crack during removal of the wax, and/or cause the fired body to have defects like marks or traces of flow of the wax. Stated in more detail, wax-based binders contained in a formed ceramic body will initiate solidification or curing accompanying a large degree of volumetric reduction, if and immediately after the formed ceramic body in an injection mold or other mold is rapidly cooled. For this reason, the ceramic body containing a binder wax is easily subject to a permanent set or residual strain, which may result in the formed body being cracked upon removal of the wax, or the fired ceramic body having the flow-mark like defects.

It is also recognized that any conventionally used binders mixed in a formed ceramic body must be removed from the ceramic body as slowly as possible, in order to protect the ceramic body from cracking during the removal of the binders. For instance, a formed ceramic body containing a conventional binder is heated at a rate as low as 1°-3°C./hr., to remove the binder from the ceramic body without cracking. Thus, the known process of fabricating ceramic products using the conventional binder suffers from a considerably low level of productivity.

In the light of the foregoing inconveniences experienced in the art, there has been a need to develop a binder (forming aid) which permits a ceramic body to be formed and fired into a desired ceramic article, without cracking or defects, and which can be easily and quickly removed from the ceramic body.

SUMMARY OF THE INVENTION

It is therefore an object of the present invention to provide a binder (aid) suitably used for forming a ceramic piece or body, with a high degree of formability and with minimum defects occuring during removal thereof.

Another object of the invention is to protect a fired ceramic article or product obtained from such a formed ceramic body, from suffering from defects like minute traces or marks of flow of the binder.

A further object of the invention lies in improving a rate of removal of the binder from the formed ceramic body without causing defects of the ceramic body, and thereby increasing the productivity of the formed ceramic article.

The above objects of the invention may be achieved according to the invention which provides an aid to be mixed in a ceramic material for forming the ceramic material into a formed ceramic body of a desired shape, including a) at least one of a thermoplastic resin and a wax, and b) a mineral oil, the content of the mineral oil being held within a range between 30% and 95% by volume, with respect to an entire volume of the aid.

The aid of the invention for forming a ceramic material may preferably futher comprise not more than, 15% by volume of a plasticizer, with respect to an entire volume of the aid. According to an advantageous features of the invention, a microcrystalline wax is used as the wax, and a paraffin oil is used as the mineral oil. The content of the mineral oil is preferably held within a range between 60% and 80% by volume.

According to another aspect of the invention, there is provided a formed ceramic body consisting essentially of 40-65% by volume of a ceramic material, and the balance of an aid for forming the ceramic material. The aid comprises a) at least one of a thermoplastic resin and a wax, and b) a mineral oil in an amount of 30-95% by volume with respect to an entire volume of said aid. The present formed ceramic body may be fired into a fired ceramic body, i.e., a desired ceramic article or product, which has minimum defects and a uniform quality.

According to a further aspect of the invention, there is provided a process of producing a ceramic article, comprising the steps of: preparing a ceramic material; preparing a forming aid which comprises a) at least one of a thermoplastic resin and a wax, and b) a mineral oil in an amount of 30-95% by volume with respect to an entire volume of the forming aid; mixing the ceramic material and the forming aid into an intimate mixture; forming the intimate mixture of the ceramic material and the aid into a formed ceramic body having a desired shape; and heating the formed ceramic body, so as to remove the forming aid, and to fire the formed ceramic body into a fired ceramic body which gives the ceramic article.

According to an advantageous feature of the process of the invention, the ceramic material is prepared in the granulated form, and may consist essentially of $Si_3N_4$, SiC or $ZrO_2$. To remove the forming aid from the formed ceramic body according to a further advantageous feature of the present process, the formed ceramic body is placed in a mass of a powder which does not react with the formed ceramic body.

DETAILED DESCRIPTION OF THE INVENTION

According to the invention, the forming aid includes as an essential component at least one of a thermoplastic resin and a wax. The thermoplastic resin which may be a component of the aid may be selected from among a wide variety of thermoplastic resins which are conventionally used for forming ceramic materials, for example, polystyrene, polyethylene, polypropylene, atactic polypropylene, etylene-vinyl acetate copolymer (EVA) resin, ethylene-ethyl acrylate copolymer (EEA) resin, and acrylic resin. To achieve the objects of the invention in an effective manner, it is preferred that the wax to be used consists of a microcrystalline wax, since the micro-crystalline wax effectively functions to maintain a shape of the formed ceramic body. However, waxes of other kinds such as paraffin and polyethylene waxes may be used.

The mineral oil, which is another essential component of the aid, is used in an amount of 30-95% by volume, preferably 60-80% by volume, with respect to the entire volume of the forming aid. While paraffin oil, aromatic oil, naphthene oil, etc. may be used, the paraffin oil is most preferred with a view to attaining the objects of the invention. Since the mineral oil has a relatively low viscosity and a relatively high vapor pressure during removal of the forming aid at an elevated temperature, the mineral oil easily exudes to the surface of the formed ceramic body, and easily evaporates. Thus, the mineral oil can be removed by exudation and evaporation, even when the pore size of the formed ceramic body is as small as a few hundreds of Angstroms. However, the removal of a conventional forming aid consisting of a wax and/or a resin requires the pore size of the formed ceramic body to be comparatively small, e.g., from a few thousands of Angstroms to a few microns. In this respect, the use of the mineral oil as a component of the forming aid permits the use of a ceramic powder having a comparatively small grain size, resulting in a formed ceramic body having a comparatively high density, which eventually enhances the properties of a fired ceramic body, i.e., the end product obtained from the formed ceramic body.

Since the forming aid or organic binder according to the invention contains 3-95% by volume of a mineral oil, the removal of the aid from the formed ceramic body can be achieved mainly through the evaporation of the mineral oil. In other words, a relatively large portion of the binder, i.e., from 30 to 95% by volume of the binder, is removed by evaporation, without stresses occurring within the formed ceramic body due to a large amount of gases that would be produced due to decomposition or oxidation of a resin if the resin was included in a relatively large amount as in a conventionally used aid or binder.

Accordingly, it is preferred that the content of the mineral oil of the forming aid be as large as possible. However, the content must not exceed 95% by volume, since the inclusion of the mineral oil in an amount exceeding that upper limit will cause an excessive reduction in the coherence of the ceramic particles of the formed ceramic body, deteriorate the ability to maintain the shape of the formed ceramic body, and reduce the ease of removal of the formed ceramic body from a mold. On the other hand, if the content of the mineral oil is lower than 30% by volume with respect to the entire volume of the forming aid, the expected effect of evaporation of the mineral oil is not saitsfactory, and the formed ceramic body tends to easily crack due to an excessively large amount of the other components. The preferred range of the content of the mineral oil is found to be from 60% to 80% by volume, in order to satisfy all of the required conditions, that is, formability of the ceramic body, ability to maintain the shape of the formed ceramic body, ease of release of the formed ceramic body from the mold, and ease of removal of the forming aid.

The mineral oil which constitutes a large portion of the forming aid as indicated above, has a pour point within a range of $-10°$ C. to $-40°$ C., which is extremely lower than the temperature at which the ceramic material is formed into a desired formed body. Therefore, the mineral oil included in the ceramic body formed under ordinary conditions will not lose its fluidity to a significant degree even if the ceramic body is rapidly cooled. This means an extremely small degree of strain produced within the formed ceramic body. As a result, the formed ceramic mass will not have cracks or other defects during removal of the forming aid and during firing of the ceramic mass.

To improve the formability of the ceramic material and the ease of removal of the formed ceramic body from the mold, it is preferred to include a suitable plasticizer in the forming aid of the invention, in an amount not exceeding 15% by volume. As the plasticizer, any plasticizers which are commonly used for forming ceramic materials may be used. For examples, the following plasticizers may be included in the forming aid: stearic acid; oleic acid; oleyl alcohol; dioctyl phthalate; and diethyl phthalate.

The individual components of the forming aid composition of the invention is mixed with a mass of a ceramic material, in a suitable known manner, to prepare an intimate mixture of the ceramic material and the forming aid. For example, all components of the aid may be previously mixed with each other, and the mixture is added to the ceramic material. In this case, the entire mass of the mixture may be added at one time, or the divided portions of the mixture mass may be added one after another at suitable intervals. Alternatively, the components of the aid may be added to the ceramic material one after another, or each previously prepared mixture of the two or more components may be added to the ceramic material. Further, the forming aid may be first mixed with a portion of the ceramic mass. In this case, the remaining portion of the ceramic mass is subsequently added to the prepared mixture. In any case, the forming agent must be uniformly mixed with the ceramic material, in a predetermined proportion. Uniform mixing of the forming agent and the ceramic material may be accomplished in a known kneading process at an elevated temperature.

The ceramic material to be formed into a formed ceramic body, whose major component is $Si_3N_4$, SiC or $ZrO_2$, may be mixed with a suitable sintering aid or aids such as $Y_2O_3$, MgO, $Al_2O_3$, CaO, $ZrO_2$, $CeO_2$, SrO, BeO, B, C and $B_4C$. The major ceramic component and the sintering aid are uniformly mixed with each other, into an intimate mixture. The optimum proportion of the sintering aid to the ceramic material is varied depending upon the sintering aid to be used, and upon the ceramic material used. Generally, 1-10 parts by weight of a selected sintering aid is added to 100 parts by weight of the ceramic material. If necessary, the intimate mixture of the ceramic material and the sintering aid or aids may be subjected to a suitable granulation process such as crushing or spray drier technique, so that the ceramic mass is prepared in a granulated form, consisting of 1-300 micron granules. The grain size of the granules may be easily measured by a laser light scattering technique. The formability of the ceramic mass is improved if the ceramic material is provided in the granulated form.

The forming aid is mixed with the thus prepared ceramic mass so that the proportion of the ceramic mass is within a range of 40-65% by volume, preferably within a range of 45-60% by volume. An excessively low proportion of the ceramic material to the forming aid will deteriorate the ability of the formed ceramic body to maintain its shape after removal of the forming aid. On the other hand, an excessively high proportion of the ceramic material will reduce the formability of the mixture of the ceramic material and the forming aid, thus making it difficult to obtain a formed body having a complicated shape, for example, a formed body which gives a rotor. In this context, the content of the ceramic material must be held within the range of 40-65% by volume.

The thus prepared intimate powder mixture of the ceramic material and the foming aid is formed into a desired formed ceramic body in a suitable forming process such as press-molding, extrusion and injection molding. In the case of injection molding, the powder mixture is processed by a pelletizer into pellets having a diameter on the order of 5 mm. The obtained pellets are supplied to a suitable injection-molding apparatus to prepare a desired formed ceramic body. In the case where an extrusion process is used, the intimate mixture as prepared is supplied to an extruder to form the desired formed ceramic body.

The prepared formed ceramic body is then placed on a honeycomb plate, or embedded in a mass of a powder which does not react with the formed ceramic body. The formed ceramic body on the honeycomb plate or embedded in the powder mass is then heated to a suitable temperature to remove the forming aid. The powder in which the formed ceramic body is embedded is preferably an activated alumina powder which has a specific surface of $5-800m^2/g$ and a grain size of 10-1000 microns. Generally, the formed ceramic body is heated up to a maximum temperature of 500° C. or lower, at 100° C./hour or lower. Preferably, the formed ceramic body is heated at 20° C./hour or lower, to an intermediate level of 300° C., and maintained at the maximum temperature (generally 400°-500° C.) for a period of 1-10 hours. Thus, the forming aid can be removed from the formed ceramic body.

In the next step, the formed ceramic body is calcined, and the surface of the calcined body is covered with an elastic film. The calcined body is then subjected to a hydrostatic pressure of 1 ton/$cm^2$, and to other necessary processes if necessary. Finally, the formed ceramic body is fired at a selected temperature under a suitable atmosphere, whereby the fired body of a desired ceramic product is produced.

As described above, the use of a forming aid which contains a relatively large amount of mineral oil according to the invention permits easy formation of a formed ceramic body, without any defects due to removal of the forming aid. Further, the formed ceramic body prepared by using the instant forming aid can be fired into a fired ceramic body which is free of defects such as minute traces of flow of the forming aid. Further, the instant forming agent can be easily removed at a comparatively high rate, and accordingly contributes to increasing the productivity of the fired ceramic body, i.e., ceramic article or product. In this respect, too, the forming aid according to the invention is useful for the industries concerned.

The present invention is thus suitably applied to the fabrication of complicated formed ceramic bodies that are usually formed by injection molding, and to the manufacture of the corresponding fired ceramic bodies or ceramic products, such as ceramic rotors having complicated shapes or configurations.

EXAMPLES

To further illustrate the principles of the present invention, there will be described several examples of producing ceramic products according to the invention. However, it is to be understood that the examples are given for illustrative purpose only, and the invention is not limited thereto, but various modifications and changes may be made in the invention, without departing from the spirit of the invention.

A ceramic material suitable for firing at the atmospheric pressure was prepared by mixing 100 parts by weight of $Si_3N_4$ powder of an average grain size of 0.8 micron with a sintering aid consisting of 2 parts by weight of SrO, 3 parts by weight of MgO and 3 parts by weight of $CeO_2$. The thus obtained imtimate mixture of $Si_3N_4$ powder and the sintering aid was rubber-pressed at 2.5 tons/cm$^2$ into a block with a bulk density of 2.0g/cm$^3$. The block was then granulated by crushing into granules having a grain size in the range of 1-300 microns. The grain size was measured by a laser light scattering technique.

The thus prepared granulated material was divided into six portions with which different compositions of an organic binder (forming aid) were mixed under heat and pressure, whereby mixtures according to Sample Nos. 1-6 of Table 1 were obtained. In the table, EVA and PE stand for ethylene-vinyl acetate copolymer resin and polyethylene, respectively, which are used as components of the organic binder or forming aid. As the mineral oil, paraffin oil having a pour point of $-30°$ C. was used.

Each of the mixtures of the granulated ceramic material and the organic binder was injection-molded at a molding pressure of 130-400Kg/cm$^2$ and a cylinder temperature of 75°-120° C., and at a mold temperature of 25°-45° C., whereby ten 25 mm cubes (formed ceramic bodies) were obtained from each mixture. These formed ceramic cubes or bodies were embedded within a mass of an activated alumina powder having a specific surface of 175m$^2$/g and a grain size of 177-210 microns, and were heated to 430° C. at a rate of 10° C./hr in a hot-air-circulating furnace. In this manner, the organic binder was removed from the formed ceramic cubes.

The ceramic cubes with the binder removed were observed for cracks. The result of observation is shown in Table 1. In the table, characters A, B and C represent the following:

A: No cracks observed
B: Slight cracks observed
C: Heavy cracks observed

As indicated in the table, Sample Nos. 1, 2 and 3 prepared according to the present invention had substantially no cracks observed. Comparative Sample No. 4 which used a conventional resin-based binder (forming aid) containing a resin as a major component had very heavy cracks. Comparative Sample Nos. 5 and 6 which used a conventional wax-based binder had comparatively small heavy cracks, but almost all of the formed ceramic cubes of Sample Nos. 5 and 6 were not found qualified to be fired into sound ceramic cubes.

After the removal of the binder, the formed ceramic cubes of Sample Nos. 1-3 of the invention, and some of the formed ceramic cubes of Comparative Sample No. 5 which had comparatively light cracks, were fired at 1720° C. for 30 minutes in a nitrogen atmosphere, whereby fired ceramic cubes of Sample Nos. 1-3 and 5 were obtained.

The thus obtained fired ceramic cubes were cut by a diamond cutter, and their cut surfaces were examined by fluorescent dye penetrant inspection methods. The examination revealed no defects or flaws on the ceramic cubes of Sample Nos. 1-3 of the present invention. However, the ceramic cubes of Comparative Sample No. 5 obtained by using the forming aid whose major component was a wax, had heavier cracks developed from the cracks which had occurred during removal of the binder. Further, the ceramic cubes of Comparative Sample No. 5 had an infinite number of minute marks which were assumed to arise from the flow ability of the binder.

As previously indicated, the formed ceramic cubes of Comparative Sample No. 5 using the wax-based binder had a relatively small number of cracks produced during the removal of the binder which was carried out while the formed ceramic cubes were heated at 10° C./hr For comparison, the binder was removed from the same formed ceramic cubes of Comparative Sample No. 5 under different heating conditions, that is, by elevating the temperature of the cubes at 3° C./hr. or 1° C./hr. to 450° C., rather than at 10° C./hr. The examination of the formed ceramic cubes which were subjected to the heating at 1° C./hr revealed substantially no cracks. However, a considerably long time was required to heat these cubes to 450° C. Thus, the alternately employed heating method for Comparative Sample No. 5 was not found practically satisfactory in terms of productivity.

TABLE 1

| Compositions (Vol. %) | Sample No. | | | | | |
|---|---|---|---|---|---|---|
| | INVENTION | | | COMPARATIVE SAMPLES | | |
| | 1 | 2 | 3 | 4 | 5 | 6 |
| Si$_3$N$_4$ | 54 | 56 | 54 | 54 | 54 | 56 |
| EVA | 3 | — | 4 | 30 | 4 | 4 |
| PE | — | 4 | — | 5 | — | 4 |
| Micro-crystalline wax | 2 | 4 | 8 | 6 | 39 | 35 |
| Oleic acid | 3 | 5 | 8 | 5 | 3 | 3 |
| Mineral oil | 38 | 31 | 29 | — | — | — |
| Vol. % of mineral oil | 83 | 70 | 63 | — | — | — |
| Number of cracks after removal of the binder | A: 8 B: 2 | A: 10 | A: 10 | C: 10 | B: 2 C: 8 | B: 1 C: 9 |
| Flow-mark like defects on cut surfaces of fired cubes | NO | NO | NO | — | YES | — |

What is claimed is:

1. A forming aid for use in greenware processing steps of a subsequently fired ceramic body comprising:
    at least one material selected from the group consisting of thermoplastic resins, waxes, and combinations thereof; and
    a mineral oil present in an amount between 60% and 95% by volume of the total volume of said forming aid;
    whereby said forming aid is mixed with a ceramic material during greenware processing steps of a ceramic body and then subsequently removed from said ceramic body by heating.

2. A forming aid according to claim 1, further comprising not more than 15% by volume of a plasticizer.

3. A forming aid according to claim 1, wherein said mineral oil is present in an amount between 60% and 80% by volume.

4. A forming aid according to claim 1, wherein said thermoplastic resin comprises at least one material selected from the group consisting of polystyrene, polyethylene, polypropylene, ethylene-vinyl acetate copolymer (EVA) resin, ethylene-ethyl acrylate copolymer (EEA) resin, and acrylic resin.

5. A forming aid according to claim 1, wherein said wax comprises a microcrystalline wax.

6. A forming aid according to claim 1, wherein said oil comprises a paraffin oil.

7. A forming aid according to claim 22, wherein said plasticizer comprises at least one material selected from the group consisting of stearic acid, oleic acid, oleyl alcohol, dioctyl phthalate, diethyl phthalate, and combinations thereof.

8. A formed greenware ceramic body comprising:
40–65% by volume of a ceramic material; and
35–60% by volume of a forming aid comprising at least one material selected from the group consisting of thermoplastic resins, waxes, and combinations thereof, and a mineral oil present in an amount between 60% and 95% by volume of the total volume of said forming aid.

9. A ceramic body according to claim 8, further comprising not more than 15% by volume of a plasticizer.

10. A ceramic body according to claim 8, wherein said mineral oil is present in an amount between 60% and 80% by volume.

11. A ceramic body according to claim 8, wherein said thermoplastic resin comprises at least one material selected from the group consisting of polystyrene, polyethylene, polypropylene, ethylene-vinyl acetate copolymer (EVA) resin, ethylene-ethyl acrylate copolymer (EEA) resin, and acrylic resin.

12. A ceramic body according to claim 8, wherein said wax comprises a paraffin, microcrystalline wax.

13. A ceramic body according to claim 8, wherein said oil comprises a paraffin oil.

14. A ceramic body according to claim 9, wherein said plasticizer comprises at least one material selected from the group consisting of stearic acid, oleic acid, oleyl alcohol, dioctyl phthalate, diethyl phthalate, and combinations thereof.

15. A ceramic body according to claim 8, wherein said body is formed by injection molding.

16. A ceramic body according to claim 8, wherein said ceramic material is present in an amount between 45–60% by volume.

17. A ceramic body according to claim 8, wherein said ceramic material comprises 1–10 parts by weight of a sintering aid for every 100 parts by weight of said ceramic material.

18. A ceramic body according to claim 17, wherein said sintering aid comprises at least one material selected from the group consisting of $Y_2O_3$, MgO, $Al_2O_3$, CaO, $ZrO_2$, $CeO_2$, SrO, BeO, B, C, $B_4C$ and combinations thereof.

19. A process of producing a ceramic article, comprising the steps of:
preparing a ceramic material;
preparing a forming aid comprising at least one material selected from the group consisting of a thermoplastic resin, a wax and combinations thereof, and a mineral oil present in an amount between 60–95% by volume of the total volume of said forming aid;
mixing said ceramic material and said forming to form an intimate mixture;
forming said intimate mixture of said ceramic material and said aid into a formed greenware ceramic body having a desired shape; and
heating said formed ceramic body to remove said forming aid and to fire said formed greenware ceramic body into a fired ceramic article.

20. A process according to claim 19, wherein said forming aid further comprises not more than 15% by volume of a plasticizer.

21. A process according to claim 19, wherein said mineral oil is present in an amount between 60% and 80% by volume.

22. A process according to claim 19, wherein said thermoplastic resin comprises at least one material selected from the group consisting of polystyrene, polyethylene, polypropylene, ethylene-vinyl acetate copolymer (EVA) resin, ethylene-ethyl acrylate copolymer (EEA) resin, and acrylic resin.

23. A process according to claim 19, wherein said wax comprises a microcrystalline wax.

24. A process according to claim 19, wherein said oil comprises a paraffin oil.

25. A process according to claim 20, wherein said plasticizer comprises at least one material selected from the group consisting of stearic acid, oleic acid, oleyl alcohol, dioctyl phthalate, diethyl phthalate, and combinations thereof.

26. A process according to claim 19, wherein said step of forming said intimate mixture of said ceramic material and said forming aid into a formed greenware ceramic body comprises injection-molding said intimate mixture into said formed greenware ceramic body.

27. A process according to claim 9, wherein said ceramic material is prepared in a granulated form before said ceramic material is mixed with said forming aid.

28. A process according to claim 19, wherein said ceramic material consists essentially of $Si_3N_4$, SiC or $ZrO_2$.

29. A process according to claim 19, wherein said step of heating said formed ceramic body to remove said forming aid comprises placing said formed ceramic body in a mass of a powder which does not react with said formed ceramic body.

30. A process according to claim 19, wherein said fired ceramic body comprises a ceramic rotor.

31. A process according to claim 19, wherein said ceramic material is present in an amount between 40–60% by volume.

32. A process according to claim 19, wherein said ceramic material comprises 1–10 parts by weight of a sintering aid for every 100 parts by weight of said ceramic material.

33. A process according to claim 19, wherein said sintering aid comprises at least one material selected from the group consisting of $Y_2O_3$, MgO, $Al_2O_3$, CaO, $ZrO_2$, $CeO_2$, SrO, BeO, B,C, $B_4C$ and combinations thereof.

* * * * *